United States Patent [19]

Naarmann et al.

[11] 3,914,329
[45] Oct. 21, 1975

[54] OLIGOMERS OF DIISOPROPYLBENZENE

[75] Inventors: Herbert Naarmann, Wattenheim;
Heinz Pohlemann, Limburgerhof,
both of Germany

[73] Assignee: BASF Aktiengesellschaft,
Ludwigshafen (Rhine), Germany

[22] Filed: July 25, 1974

[21] Appl. No.: 491,625

[30] Foreign Application Priority Data
July 13, 1973   Germany............................ 2338709

[52] U.S. Cl. ........................ 260/668 R; 260/2.5 FP
[51] Int. Cl.$^2$...................... C07C 15/04; C07C 3/02
[58] Field of Search.................. 260/668 R, 670, 2.5

[56]  References Cited
UNITED STATES PATENTS
3,457,204   7/1969   Burger et al. .................. 260/2.5 FP Primary Examiner—Delbert E. Gantz
Assistant Examiner—G. J. Crasanakis
Attorney, Agent, or Firm—Johnston, Keil, Thompson & Shurtleff

[57]  ABSTRACT

Colorless oligomers of diisopropylbenzene are prepared by reacting an isomer mixture containing m- and p-diisopropylbenzenes with an organic peroxide in the presence of an inorganic reducing agent. The oligomers may be used as synergists for flameproofing thermoplastics with bromine compounds.

6 Claims, No Drawings

OLIGOMERS OF DIISOPROPYLBENZENE

The application discloses and claims subject matter described in German Patent Application P 23 38 709.9, filed July 31, 1973, which is incorporated herein by reference.

This invention relates to oligomers of diisopropylbenzene and to a process for their manufacture by reacting a mixture containing m- and p-diisopropylbenzene with an organic peroxide in the presence of an inorganic reducing agent.

Oligomers of diisopropylbenzene are made use of as synergists in flameproofing thermoplastics with bromine compounds. U.S. Pat. No. 3,457,204 describes styrene polymers which have been flameproofed in this manner. Hitherto, only oligomers of p-diisopropylbenzene have been used in industry. They are prepared by the oxidative condensation of p-diisopropylbenzene with organic peroxides as described by V. V. Korshak et al. in "Polymer Science USSR," 1, pp. 341 to 359 (1960).

p-Diisopropylbenzene results from the reaction of propene in the presence of Friedel-Crafts catalysts. It is contained in the alkylation mixture to an extent of about 10–40 percent by weight and must be separated from the m-isomer, which boils only 6°C lower, by laborious fractional distillation.

If an attempt is made to take this mixture without separation and oligomerize it with peroxide by the Korshak method, products having a strong yellow color are formed which cannot be used as additives to thermoplastics.

It is an object of the present invention to produce colorless oligomers from the cheap mixture of diisopropylbenzenes produced in the Friedel Crafts reaction of benzene with propene.

This object is achieved by reacting 100 parts of said mixture containing from 50 to 80 percent by weight of m-diisopropylbenzene and from 10 to 40 percent by weight of p-diisopropylbenzene with from 5 to 100 parts by weight of an organic peroxide compound at temperatures between 150° and 230°C and in the presence of from 0.1 to 2 parts by weight of an inorganic reducing agent. The Friedel Crafts reaction of benzene with propene is well known. It is described, for example, in "Organikum," p. 302, 1965, published by VEB Verlag der Wissenschaften, Leipzig. When the reaction mixture is worked up by distillation, a mixture is produced at from 200° to 210°C which contains from 50 to 80 percent and preferably from 60 to 70 percent of m-diisopropylbenzene, from 10 to 40 percent and preferably from 20 to 30 percent of p-diisopropylbenzene and from 5 to 15 percent of indefinite organic compounds.

According to the present invention, this mixture is reacted with an organic peroxide compound in the presence of an inorganic reducing agent. The reaction takes place at temperatures of from 130° to 230°C and preferably from 160° to 190°C. Advantageously, a peroxide compound is used which dissociates into free radicals at these temperatures. Advantageously, the half-life of the peroxide in this temperature range should be from 10 to 100 minutes. Suitable peroxides are for example di-t-butyl peroxide, chlorobenzene peroxide, t-butylphthalide peroxide, t-butylphenylphthalide hydroperoxide, di-1-methylcyclohexyl peroxide and 2,5-dimethyl, 2,5-(di-t-butylperoxy)hexane. We prefer to use from 5 to 100 parts and preferably from 20 to 60 parts of peroxide for every 100 parts of diisopropylbenzene mixture, by weight.

The reaction may be carried out batchwise or continuously. It is advantageous to premix the peroxide with diisopropylbenzene before it is fed to the reaction vessel. This technique is described in detail in German Published Application 1,770,294. In order to obtain colorless oligomers, from 0.1 to 2 parts and preferably from 0.5 to 1.2 parts by weight of an inorganic reducing agent, which is preferably water-soluble, must be added for every 100 parts by weight of diisopropylbenzene mixture. It may be assumed that the components of the diisopropylbenzene mixture giving rise to discoloration accumulate during the reaction in the aqueous/alcoholic phase which forms from the decomposition products of the peroxide. The inorganic reducing agent is not miscible with the organic phase of the reaction mixture and thus does not react with the peroxide. Instead, it also passes into the aqueous/alcoholic phase, where it reacts with the unwanted components. Examples of useful reducing agents are phosphorous acid, sulfurous acid, sodium hydroborate, sodium formaldehyde sulfoxylate, Raney nickel, copper chromite, aluminum powder and cadmium grit.

The resulting oligomers of diisopropylbenzene contain from 55 to 85 percent by weight of m-diisopropylbenzene units and from 15 to 45 percent by weight of p-diisopropylbenzene units. Their average degree of polymerization is from 3 to 30 and preferably from 4 to 10. They are colorless homogeneous substances of the consistency of honey and show good solubility in organic solvents such as styrene or butyl stearate and are thus readily metered in this form in the manufacture of flameproofed shaped articles.

The oligomers may be used as synergists in flameproofing thermoplastics containing organic bromine compounds. The flameproofed compositions contain from 0.1 to 5 percent and preferably from 0.5 to 3 percent by weight of bromine and additionally from 0.1 to 5 percent and preferably from 0.02 to 2 percent by weight of the diisopropylbenzene oligomers. The bromine compounds themselves should contain more than 40 percent by weight of bromine. Highly suitable are, for example, hexabromocyclododecane, octabromohexadecane and brominated rubbers and also bromination products of diphenyl or its derivatives.

These products may be used for flameproofing mainly polyolefins and styrene polymers. Suitable polyolefins are polyethylene and polypropylene and suitable styrene polymers are homopolystyrene, impact-resistant polystyrene and copolymers of styrene with, say, α-methylstyrene, acrylonitrile, methyl methacrylate and acrylates. Particularly significant are molding compositions containing expanding agents for the preparation of self-extinguishing foamed articles.

In the following Examples the parts and percentages are by weight.

EXAMPLE 1 a. 440 parts of a diisopropylbenzene mixture containing 60 percent of meta-isomer and 30 percent of para-isomer are heated at 180°C. There are then added, with stirring over 2 hours, a further 60 parts of the diisopropylbenzene mixture together with 300 parts of di-t-butyl peroxide and 5 parts of phosphorous acid. Following a reaction time of 1 hour at 185°C, the volatile components are distilled off at an internal temperature of 150°C and a pressure of 2 mm Hg.

The residue consists of 360 parts of a white-semi-solid composition having a viscosity at 100°C of 3,500 centipoise and having a degree of polymerization of from about 5 to 7 as determined by infrared assessment via the ratio of intact isopropyl groups to tetramethylethane groups.

b. If the above process is repeated omitting the phosphorous acid, there is produced a yellow composition which causes discoloration when added to non-pigmented polyolefins (e.g. polystyrene and polypropylene).

Tests on the oligomers obtained under (a) above as flameproofing synergists gave the following results (effect tested on polystyrene according to UL/Subject 94, vertical burning test (127×12.7×1.6 mm))

| Oligomer (%) | Hexabromocyclododecane (%) | Extinguishing time (sec.)+ |
|---|---|---|
| — | — | burns completely |
| — | 1.0 | 15.5 |
| 1.0 | 1.0 | 4.5 |
| 0.5 | 1.0 | 5.5 |
| 0.5 | 1.25 | 5.0 |

+Total extinguishing time (seconds) after flaming twice for 10 seconds each (5 test rods, 10 ignitions)

EXAMPLE 2

Example 1 is repeated except that 5 parts of sodium hydroborate are used in place of phosphorus acid. There is again obtained a colorless oligomer.

Tests using this oligomer on polypropylene gave the following results (conditions as in Example 1).

| Oligomer (%) | Hexabromo-cyclododecane (%) | $Sb_2O_3$ (%) | Extinguishing time (sec.) |
|---|---|---|---|
| 0.2 | 2.0 | 1.0 | 5 |
| 1.0 | 2.0 | 1.0 | no combustion | a. 500 parts of a diisopropylbenzene mixture containing 60 percent of meta-isomer and 30 percent of para-isomer are heated at 185°C. There are then added, with stirring over 2 hours, 300 parts of t-butylphenylphthalide hydroperoxide and 3 parts of cadmium grit. Following reaction under the conditions described in Example 1, 345 parts of a white composition having a degree of polymerization of about 6 to 9 are obtained after filtration.

b. The above process is repeated omitting the reducing agent to give a yellow-colored composition.

We claim:

1. A process for the manufacture of oligomers of diisopropylbenzene, wherein 100 parts of a mixture obtained from the Friedel Crafts reaction of benzene with propene and containing from 50 to 80 percent of m-diisopropylbenzene and from 10 to 40 percent by weight of p-diisopropylbenzene are reacted with from 5 to 100 parts by weight of an organic peroxide compound at temperatures of from 130° to 230°C and in the presence of from 0.1 to 2 parts by weight of an inorganic reducing agent.

2. A process as claimed in claim 1, wherein an organic peroxide compound is used which has a half-life at the reaction temperature of from 10 to 100 minutes.

3. A process as claimed in claim 1, wherein the organic peroxide compound used is di-t-butyl peroxide.

4. A process as claimed in claim 1, wherein a water-soluble inorganic reducing agent is used.

5. A process as claimed in claim 1, wherein the reducing agent is used in phosphorous acid.

6. Colorless oligomers of diisopropylbenzene having an average degree of polymerization of from 3 to 30 and containing from 55 to 85 percent by weight of m-diisopropylbenzene units and from 15 to 45 percent by weight of p-diisopropylbenzene units.

* * * * *